United States Statutory Invention Registration [19]

[11] Reg. Number: H70

Berkowitz et al.

[45] Published: Jun. 3, 1986

[54] METHOD FOR PRODUCING NUTRITIONALLY DENSE FREEZE DRIED FOOD BARS

[75] Inventors: Daniel Berkowitz, Wellesley; Gary W. Shults, Upton; Agnes G. Russell, Framingham, all of Mass.

[73] Assignee: The United States of America as represented by the Secretary of the Army, Washington, D.C.

[21] Appl. No.: 600,241

[22] Filed: Apr. 16, 1984

[51] Int. Cl.[4] ..... A23C 1/06

[52] U.S. Cl. ..... 426/385; 34/5; 426/444; 426/465; 426/105; 426/513; 426/640

[58] Field of Search ..... 426/810, 385, 646, 513, 426/640, 444, 465, 454, 105, 135, 140, 129, 284, 413

[56] References Cited

U.S. PATENT DOCUMENTS

| | | | |
|---|---|---|---|
| 2,765,236 | 10/1956 | Blaine | 426/385 |
| 3,264,121 | 8/1966 | Tuomy et al. | 426/640 |
| 4,096,283 | 6/1978 | Rahman | 426/277 |

OTHER PUBLICATIONS

Tappel et al. "Freeze-Dried Meat" Food Tech. Nov., 1957 pp. 599-603.

*Primary Examiner*—John F. Terapane
*Assistant Examiner*—S. Wolffe
*Attorney, Agent, or Firm*—Robert P. Gibson; Anthony T. Lane; Mark Goldberg

[57] ABSTRACT

A method of producing a nutritionally dense, freeze dried food item usually in bar form in which uncooked food ingredients are mixed together and then cooked until about 40% to about 60% of the water content is removed by evaporation. Then the partially dried mixture is formed into the desired shape, then frozen and dehydrated to a moisture level which would produce a shelf-stable product. The freeze dried bars are packaged in impermeable containers. Food bars prepared by this method rehydrate faster and to a greater extent than food bars prepared by processes incorporating a compression step.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR PRODUCING NUTRITIONALLY DENSE FREEZE DRIED FOOD BARS

The invention described herein may be manufactured, used, and licensed by or for the Government for governmental purposes without the payment to us of any royalty thereon.

BACKGROUND OF THE INVENTION

This invention relates to a method of producing freeze-vacuum-dehydrated particulate foods, such as vegetables and meats without resorting to compaction, such that the dehydrated foods will have bulk densities which nearly approach the bulk densities of compacted foods. These foods readily rehydrate to substantially the same distinct particulate states in which they existed prior to freeze dehydration.

Freeze drying of foods is a well-known method for preserving foods so that they can be stored at room temperature or even higher temperatures for long periods of time, provided they are maintained at very low moisture levels during such storage. When properly prepared and stored, such foods may be rehydrated at the time it is desired to consume them, the reconstituted foods being of quality approaching that of freshly prepared foods of the same types.

In recent years, the military forces have found it to be highly desirable to utilize freeze dried foods in compact form so that the foods will occupy appreciably less space in submarines, in aircraft and also when carried on the person. Compact foods are generally formed into cylindrical or rectangular shaped bars which are of a convenient form to be stored and carried.

Various techniques have been used to reduce the volumes and increase the densities of dehydrated foods without destroying the ability to return to substantially the conditions they were in prior to dehydration. The technology for forming freeze dried food bars by compression is complex and costly, requiring considerable handling of the product with a commensurate loss in quality. The techniques heretofore employed required two freeze drying steps and a plasticization step.

One of the methods of producing compacted freeze-dried foods is in accordance with the teachings of Ishler et al, U.S. Pat. No. 3,385,715, whereby a food is first freeze-dried to a low moisture level, such as about 1.1% to about 2.2%. Then the freeze dried food is sprayed with enough water to raise its average moisture content to from about 5% to about 13% so that, when compaction of the freeze-dried food is carried out, the food will not shatter, but will flow while maintaining its cellular structure and the particles of food will adhere to each other when compacted. The added moisture serves as a plasticizer which prevents pulverization of the dried food during mechanical compaction. In order for plasticization to have the desired effect, the food particles must be sprayed with water or an aqueous solution of a gum or the like and then to be permitted to stand long enough for the water to substantially equilibrate throughout the food particles. This equilibration process may take several hours to permit uniform distribution of the added water. After compaction is carried out, the compacted food is usually freeze-vacuum dehydrated to a moisture level sufficiently low to maintain good quality upon storage. This, of course, means that a substantial amount of freeze drying, an expensive process in itself, has to be repeated to remove the water added during the plasticization step. Futhermore, the slowness of the equilibration makes it virtually necessary for the dehydration and compaction process to be carried out in stages rather than in a continuous manner, as would be desirable, resulting in higher production costs and lower product quality.

Various approaches have been made to avoid the above-mentioned repetition of freeze-drying in the production of nutritionally dense food bars. One such approach involves stopping the initial freeze-drying of the food particles to a moisture level of from 5 to about 13% and then compacting the partially freeze-dried food. However, as is well known in the food freeze drying art, the cores of the food particles being freeze vacuum dehydrated remain frozen until most of the moisture that is removed from the food has sublimed and the water vapor formed thereby has migrated through the outer portions of the food particles under the influence of the vacuum. Thus, if the freeze-vacuum-dehydration is stopped at 5-13 percent moisture content as disclosed in the Ishler et al patent, the outer portions of the particles of food are extremely dry while the cores contain essentially their original concentrations of water as ice. If such food particles are then compacted without permitting equilibration to occur, the extremely dry outer portions of the particles shatter and the compacted product has very poor properties. In such a case, it is impossible to restore the original particle sizes and shapes upon rehydration. One solution to this problem is to hold the particles of partially freeze-dried food in closed containers at temperatures have 0° C. to permit equilibration of the moisture from the frozen cores throughout the particles of food. Such equilibration, however, proceeds very slowly, and the larger the food particles, the more slowly equilibration occurs.

U.S. Pat. No. 4,096,283 disclosed a method of speeding up the equilibration process described above through the use of microwave energy to distribute the moisture through the food. However, this process retains the disadvantages inherent in two freeze vacuum dehydration steps with the additional handling of the food required. In U.S. Pat. No. 3,950,560 the disadvantages of two freeze drying steps were avoided by predrying (without freezing) a vegetable in morsel form to a moisture content from about 7 percent to about 18 percent by weight, compressing the predried, vegetable morsels to form a compacted, vegetable mass and then redrying the compacted vegetable mass to a moisture content of less that 5 percent by weight. Prior efforts to produce a satisfactory nutritionally-dense, freeze-dehydrated food product share several undesirable characteristics. Compressed food bars rehydrate slowly. Frequently, warm or hot water is required to rehydrate within a reasonable period of time. Furthermore, those processes which require multiple applications of freeze-vacuum-dehydration, as opposed to a single application, cause the food to be exposed to air for longer periods of time with an increase in deterioration due to oxidative rancidity.

It is an object of this invention to provide an improved method of producing nutritionally dense freeze dried food bars so that upon rehydration the foods will be restored to substantially the same distinct particulate form in which they existed prior to dehydration of the foods and so that the reconstituted foods will be of high quality and as closely comparable as possible to the original raw or cooked foods from which the freeze-dried particulate foods are prepared.

Other objects and advantages will become apparent from the following description of the invention.

SUMMARY OF THE INVENTION

Production of nutritionally-dense, freeze-dried, food bars according to this invention is accomplished by first preparing a mixture of particulate food ingredients which are predried during a cooking process to a moisture level about 40 percent to about 60 percent less but preferably about 45 percent to about 55 percent than the moisture level prior to predrying. The predrying will occur as direct evaporation during the cooking process. The partially dried product is formed into any desired shape by packing into an appropriate container. The product is then frozen and while frozen is sliced into the desired size product which is placed in a freeze dryer and dehydrated to about 2.0 percent moisture. After dehyration the dried product is enclosed in a package which is impermeable to air and moisture. The dehydrated food bars produced by this invention have bulk densities which nearly approach the bulk densities of similar but compressed food bars and rehydrate faster and to a greater extent than food bars prepared by a process incorporating a compression step.

DESCRIPTION OF THE INVENTION

This invention produces nutritionally-dense dehydrated food bars without compression. It has been found that partial predrying prior to freeze-drying allows the production of a food bar having nearly similar density to that produced by compression such as described in U.S. Patent No. 3,385,715, but with the capability of rehydrating more quickly and more thoroughly than the freeze-dried compressed item. This improved product occurs for several reasons. During the cooking of the mixture of ingredients to be incorporated in the food bar, about 40 percent to 60 percent of the water content is allowed to exaporate. The cooking is done in a conventional or vacuum steam jacketed kettle. The amount of water removed at this stage will determine the ultimate density, compactness, cohesion and rate and extent of rehydration of the end product. If too much water is removed at this stage, then the product becomes too dense and rehydration becomes difficult. If on the other hand, not enough water is removed, then the finished product will not be dense enough. When the correct amount of water is removed during the cooking stage, the volume of food material diminishes with a corresponding increase in density. After the cooked and partially dehydrated food bars have been packed or formed into the desired shape, there remain no visible voids or air pockets. There does, however, remain about 45 percent to 55 percent water which, following freezing, becomes randomly distributed ice crystals throughout the bars. The sublimation of these ice crystals during freeze dehydration results in the creation of an open i.e. porous structure with a large surface area for rapid penetration and imbibition of water during the rehydration step. With the existence of this open structure there is a greater opportunity for and less resistance to penetration and uptake of water during rehydration than in compressed foods where the open structure resulting from freeze dehydration is largely destroyed by mechanical compaction.

The dehydrated food bars typically had a density of about 0.60 grams/cubic centimeter and almost always the density was in the range of 0.40 to 0.70g/cc. These densities were about 80% to about 110% of compressed, dehyrated food bars. The compressed food bars had been compressed at pressures above 300 pounds per square inch while with the invention described herein there is no such compression. The pressures used in forming compressed food bars have typically been described as being in the range of 1500 pounds per square inch.

The predried foods can be packed or molded by being stuffed into sausage casings of the desired circumference and frozen to obtain cylindrical food logs. Other geometrical shapes may be obtained by restraining the food by metal, plastic or wood compession plates, boxes, mols, cages or spring loaded screens or by other means prior to freezing. The frozen shaped food bar may then be cut into individual portions. It is to be understood that whenever a "food bar" is referred to this is not to be limited to a rectangular shape but may be of any shape desired. Alternatively, the cooked, partially dried product may be dispensed into individual molds of the desired shape or machine formed into the desired shape. Food bars may be formed in any desired shape that is appropriate for freeze-dehydration. For example, bars having dimensions of $1\times3\times0.5$ inches have been found to be suitable from the standpoint of relative ease of freeze dehydration and packaging. The molded or formed product is then solidly frozen prior to freeze drying. The freeze-vacuum dehydration of the foods may be carried out by any conventional process for freeze vacuum dehydrating food products. The food bar is dehydrated to a moisture content of from about 1% to about 5% and preferably, for long-term storage, not more than 2%, to provide stability of the food when it is packaged in a moisture and gas impermeable container. The final drying may also be done by vacuum oven drying without freezing. The packaging material which is impermeable to moisture and preferably impermeable to oxygen may be a flexible package made of a laminate which usually comprises one layer which is heat-sealable and is the innermost layer of the package, such as polyethylene and an outermost layer of a material which is strong and resistant to most common types of damage, such as polyethylene terephthalate. Aluminum foil, an effective moisture and gas barrier, is sandwiched between the inner heat-sealable polyethylene layer and the strong outer layer of polyethylene terephthalate.

The following specific examples of formulations of nutritionally dense food items are only several of the examples of formulations which may be readily made in accordance with the above described principles of the invention. A wide variety of meats and vegetables may be used in food bars. Fruits and grains could also be incorporated in formulations. It will be understood, of course, that the above-mentioned and other advantages of this invention may also be accomplished by suitable variations in the detailed method steps, about to be set forth below, which are intended to be for illustrative purposes, and not for limiting the scope of the invention. All of the percentages used are by weight.

Example 1

A beef stew food bar is prepared by mixing the following ingredients of the percentage levels noted:

| Ingredient | % |
|---|---|
| Ground Beef | 49.00 |
| Dehydrated diced onion | 1.00 |

-continued

| Ingredient | % |
|---|---|
| Onion powder | 0.65 |
| Salt | 1.00 |
| Ground black pepper | 0.08 |
| Garlic powder | 0.03 |
| Dehydrated beef stock | 1.50 |
| Ground paprika | 0.10 |
| Ground celery seed | 0.03 |
| Granular lecithin | 0.22 |
| Caramel color | 0.10 |
| Ground bay leaf | 0.02 |
| Ground all spice | 0.02 |

To the above mixed ingredients is added a mixture consisting of:

| Ingredient (Cont.) | % |
|---|---|
| Corn starch, modified | 2.00 |
| Microcrystalline cellulose | 0.75 |
| Gum arabic | 2.00 |

A vegetable mixture consisting of the following mixture of peas, carrots and potatoes is added:

| | |
|---|---|
| Frozen slit peas | 5.50 |
| Frozen diced carrots | 14.00 |
| Dehydro-frozen diced potatoes | 22.00 |

The potatoes used have been partially freeze dried. Before being added to the formulation, the potatoes are rehydrated to their normal water level. Blanched potatoes may be substituted. The mixture is cooked in a steam kettle until the moisture content is preferably reduced about 45% to about 55% below the moisture level before cooking. The cooking is for about 30 minutes. The partially dried mixture is then molded by stuffing into sausage casings. After being molded the formed food bar is frozen solid at −40° F. and cut into individual sized servings. Then the frozen portions are further dehydrated to a moisture content of about 2 percent by weight and packed in a moisture proof container. The bars of nutritionally dense beef stew were reconstituted by pouring an excess of 180° F. water over a food bar and permitting the bars to stand in the water for a length of time as needed to substantially rehydrate the beef stew, this time amounting to about 2–3 minutes. The components of the beef stew were similar in appearance and acceptance to that of the beef stew before molding.

Example 2

A chicken a la king food bar is prepared by mixing the following ingredients at the percentage levels noted:

| Ingredient | % |
|---|---|
| Ground chicken, ground through ⅛ inch plate | 59.92 |
| Mushroom stems and pieces | 6.00 |
| Frozen chicken broth | 4.50 |
| Frozen chicken fat | 2.50 |
| Slit frozen green peas | 5.00 |
| Mushroom brine | 3.00 |
| Powdered vegetable shortening | 3.00 |
| Canned diced pimentoes | 3.00 |
| Diced, dehydrated onions | 1.50 |
| Frozen green peppers | 5.00 |
| Monosodium Glutamate | 0.64 |

-continued

| Ingredient | % |
|---|---|
| Salt | 0.63 |
| Ground celery | 0.03 |
| Lecithin | 0.38 |
| White pepper | 0.08 |
| Ground bay leaf | 0.04 |
| Microcrystalline cellulose | 0.75 |
| Starch | 2.00 |
| Gum arabic | 2.00 |
| Concentrated butter extract | 0.06 |

This food bar is prepared by the same method described in Example 1. The chicken a la king food bars had a density of 0.49g/cc, 82% of the density of similarly formulated compressed food bars. These food bars had significantly improved quality upon rehydration when compared to the compressed food bars.

Example 3

A pork and escalloped potato food bar is prepared from the following ingredients:

| Ingredient | % |
|---|---|
| Ground pork | 53.05 |
| Dehydrated frozen potatoes | 27.00 |
| Frozen diced green peppers | 5.00 |
| Dehydrated meat stock | 4.00 |
| Dehydrated cream cheese | 3.50 |
| Dehydrated diced onions | 2.00 |
| Gum arabic | 2.00 |
| Corn starch, modified | 2.00 |
| Salt | 1.00 |
| Lecithin | 0.25 |
| Garlic powder | 0.06 |
| Ground white pepper | 0.03 |
| Ground celery seed | 0.03 |
| Ground thyme | 0.03 |
| Ground oregano | 0.01 |

This food bar is prepared by the same method described in Example 1. The food bar was of superior sensory quality after rehydration when compared with rehydrated compressed bars. The food bars had greater stability when stored at high temperatures than did compressed bars of similar formulation.

Example 4

A pork and rice oriental style food bar is prepared from the following ingredients:

| Ingredient | % |
|---|---|
| Raw ground pork, ground with ⅛" blade | 54.30 |
| Instant rice | 26.00 |
| Soy sauce | 6.00 |
| Onion powder | 1.50 |
| Ground corriander | 0.25 |
| Garlic powder | 0.10 |
| Ground celery seed | 0.10 |
| Ground ginger | 0.04 |
| Dehydrated meat stock | 3.00 |
| Salt | 1.00 |
| Ground fennel | 0.01 |
| Lecithin | 0.20 |
| Frozen slit green peas | 2.50 |
| Cooked scrambled eggs | 5.00 |
| Corn starch, modified | 2.00 |
| Gum arabic | 2.00 |

The instant rice is cooked in water for about 3 minutes before being added. The pork and rice oriental food bars had densities of between 0.60 and 0.64g/cc as compared to a density of 0.61g/cc for a freeze dried compressed bar. This food is prepared according to the method of Example 1.

EXAMPLE 5

A chicken stew food bar is prepared from the following ingredients:

| Ingredient | % |
|---|---|
| Ground chicken, ground with ⅜" plate | 43.31 |
| Frozen chicken broth | 6.00 |
| Chicken fat | 3.10 |
| Diced Dehydrated onions | 2.00 |
| Salt | 1.00 |
| Monosodium glutamate | 0.28 |
| White pepper | 0.05 |
| Ground celery seed | 0.026 |
| Ground bay leaf | 0.023 |
| Ground sage | 0.023 |
| Ground thyme | 0.023 |
| Ground all spice | 0.01 |
| Dehydrated frozen potatoes | 19.50 |
| Carrots (⅜ cubic inch) | 13.50 |
| Corn starch, modified | 2.23 |
| Dehydrated cream cheese | 2.78 |
| Lecithin | 0.28 |
| Frozen slit peas | 3.87 |
| Gum arabic | 2.00 |

The food bar is prepared according to the method of Example 1, producing a food bar of superior quality when compared to a chicken stew compressed, dehydrated food bar.

Example 6

A spaghetti with meat sauce food bar is prepared according to the method of Example 1 with the following ingredients:

| Ingredient | % |
|---|---|
| Raw ground beef, ⅛" plate | 58.55 |
| Tomato paste | 19.00 |
| Salt | 1.25 |
| Sugar | 1.00 |
| Dehydrated chopped onions | 1.00 |
| Dehydrated green peppers | 1.00 |
| Oregano flakes | 0.04 |
| Garlic powder | 0.17 |
| Basil | 0.04 |
| Cayenne pepper | 0.03 |
| Ground bay leaf | 0.02 |
| Parmesan cheese | 2.00 |
| Ground fennel | 0.01 |
| Ground thyme | 0.01 |
| Ground celery seed | 0.03 |
| Lecithin | 0.25 |
| Dry 2 inch precut spaghetti | 14.50 |
| Paprika | 0.10 |
| Microcrystalline cellulose | 1.00 |

The spaghetti with meat sauce food bar had a density of 0.69g/cc, 112% the density of a similarly formulated freeze dehydrated compressed food bar. The ground beef is cooked in excess water with all of the dry ingredients except for the sphaghetti (which is cooked separately), the tomato paste and microcrystalline cellulose which are later added.

It is apparent from the above formulations that a wide variety of vegetables, meat and meat vegetable combinations may be processed in accordance with the present invention to produce nutritionally dense food items which are readily rehydratable. Other meats such as veal and lamb may be used as well as other vegetables. The process is much more economical than prior processes which require compaction and multiple freeze-vacuum dehydration steps. The food bars of this invention are very storage stable when vacuum-packed in a moisture and gas-impermeable container. As compared to those processes which required equilibration of moisture prior to compression and those processes requiring two separate freeze-dehydration steps, the food items of this invention are less likely to experience oxidative rancidity during processing, thus reducing spoilage and deterioration in quality. The food bars of this invention rehydrate in 2 to 3 minutes with warm water (125°–200° F.) while many freeze dried compressed bars take 8 to 10 minutes or longer under similar conditions. Some compressed bars will not rehydrate completely no matter how long they remain in the water. The quality of the food bars was much better than compressed dehydrated bars, especially after storage for one month at 125° F. Much less rancidity and degradation were observed after this high temperature storage. It was found that food bars could be produced of a density approaching that found in bars compressed at high pressures. The spaghetti and meat sauce food bar had an even greater density than a compressed food bar.

It will be understood that various changes in the details of the process and the ingredients which have been herein described and illustrated in order to explain the nature of the invention, may be made by those skilled in the art within the principle and scope of the invention. For example, any method of preconcentration (elimination of water) may be used such as vacuum evaporation, reverse osmosis, dialysis, etc.

We claim:

1. A method of producing a nutritionally dense freeze dried food bar comprising:

a. preparing a mixture of uncooked food ingredients of said bar, b. cooking and partially drying said mixture of uncooked food ingredients until about 40% to about 60% of the water content is removed by evaporation, c. forming the mixture into food bars, d. freezing said food bars, e. dehydrating said food bars to a moisture content which will produce a shelf-stable product, and f. packaging said food bars in a moisture and gas impermeable container.

2. The method of producing a nutritionally dense freeze dried food bar according to claim 1 wherein after dehydration the moisture content of said bar is from about 1 percent to about 5 percent by weight.

3. The method of producing a nutritionally dense freeze dried food bar according to claim 2 wherein 45–55 percent of said water content is removed during the cooking step.

4. The method of producing a nutritionally dense freeze dried food bar according to claim 3 wherein said bar is dehydrated to about 2 percent by weight moisture.

5. A method of producing a nutritionally dense freeze dried food bar according to claim 4 wherein said cooked mixture is formed into a bar by stuffing said mixture into a sausage casing.

6. The method of producing a nutritionally dense freeze dried food bar according to claim 4 wherein said cooked mixture is formed into the desired shape by packing in a mold.

7. The method of producing a nutritionally dense freeze dried food bar according to claim 5 wherein said food bar has a density between about 0.40 g/cc and about 0.70 g/cc.

8. The method of producing a nutritionally dense food bar according to claim 7 wherein said food bar has a density which is about 80% to about 110% of the density of a second food bar which has been compressed at pressures above 300 pounds per square inch.

9. The method of producing a nutritionally dense freeze dried food bar according to claim 8 wherein said uncooked food ingredients, comprising the majority of the mass of said food bar are selected from edible meats and vegetables, said meats consisting of chicken, beef, pork, lamb and veal and said vegetables consisting of potatoes, carrots, peas and onions.

10. The method of producing a nutritionally dense freeze dired food bar according to clam 9 wherein said uncooked food ingredients are selected from pork and rice; chicken, potatoes and carrots; ground beef and spaghetti; ground pork and potatoes; and ground beef, peas, carrots and potatoes.

* * * * *